(12) United States Patent
Rasmussen et al.

(10) Patent No.: US 9,804,810 B2
(45) Date of Patent: Oct. 31, 2017

(54) DOCUMENT FINISHING ARCHITECTURE PROFILE MANAGEMENT

(71) Applicant: XEROX CORPORATION, Norwalk, CT (US)

(72) Inventors: David L. Rasmussen, Fairport, NY (US); Carol-Lynn Vidjan, Rochester, NY (US); Dara N. Lubin, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/879,856

(22) Filed: Oct. 9, 2015

(65) Prior Publication Data

US 2017/0102904 A1 Apr. 13, 2017

(51) Int. Cl.
*G06F 3/12* (2006.01)
*G06K 15/02* (2006.01)

(52) U.S. Cl.
CPC .......... *G06F 3/1264* (2013.01); *G06F 3/1205* (2013.01); *G06F 3/1257* (2013.01); *G06F 3/1284* (2013.01)

(58) Field of Classification Search
None
See application file for complete search history.

(56) References Cited

U.S. PATENT DOCUMENTS

| 6,930,798 B1 * | 8/2005 | Kaneko | H04N 1/0057 |
| | | | 358/1.13 |
| 2004/0076445 A1 * | 4/2004 | Seto | G03G 15/6582 |
| | | | 399/82 |
| 2005/0042007 A1 * | 2/2005 | Fujii | G03G 15/50 |
| | | | 399/407 |
| 2006/0127122 A1 * | 6/2006 | Arai | G03G 15/5087 |
| | | | 399/82 |
| 2006/0238777 A1 * | 10/2006 | Anno | H04N 1/00127 |
| | | | 358/1.1 |
| 2006/0238786 A1 * | 10/2006 | Sakura | G06F 3/1205 |
| | | | 358/1.9 |
| 2006/0238793 A1 * | 10/2006 | Akashi | G06F 3/1204 |
| | | | 358/1.13 |
| 2007/0009270 A1 * | 1/2007 | Kawano | G03G 15/6529 |
| | | | 399/13 |
| 2007/0057446 A1 * | 3/2007 | Nishimura | B65H 43/00 |
| | | | 271/258.03 |
| 2008/0123125 A1 * | 5/2008 | Fukuda | H04N 1/00344 |
| | | | 358/1.13 |
| 2009/0323097 A1 * | 12/2009 | Iizuka | H04N 1/4406 |
| | | | 358/1.14 |
| 2014/0042686 A1 * | 2/2014 | Konishi | B65H 29/125 |
| | | | 270/58.31 |
| 2014/0042694 A1 * | 2/2014 | Konishi | B65H 39/00 |
| | | | 271/279 |
| 2015/0281469 A1 * | 10/2015 | Nishimura | H04N 1/0032 |
| | | | 358/1.13 |

* cited by examiner

*Primary Examiner* — Beniyam Menberu
(74) *Attorney, Agent, or Firm* — Caesar Rivise, PC

(57) ABSTRACT

A method of operating a document finishing device is provided. The method includes installing first data relating to physical capabilities of the document finishing device in a document finishing device; connecting the document finishing device to a printer; copying the first data from the document finishing device to the printer; causing the printer to interpret the first data; and causing the printer to adjust its output capabilities based on the first data.

10 Claims, 3 Drawing Sheets

DOCUMENT FINISHING ARCHITECTURE PROFILE MANAGEMENT

BACKGROUND

Disclosed herein is a system and method for managing the document finishing architecture profiles in a printer/finisher system.

Embodiments of the disclosure are well suited for managing the document finishing architecture profiles in a system that uses a printer from one manufacturer and a document finisher from another manufacturer.

SUMMARY

Document finishing devices take the documents outputted by a printer and perform some task such as, for example, combining, stapling, coating, or other operation. A particular document finishing device and the printer it is connected to may be manufactured by different companies. This can cause problems in the communication between the document finishing device and the printer which can, in turn, cause problems such as, for example, jams.

Information concerning the input capabilities of a document finishing device is known as a document finishing architecture (DFA) profile. The DFA profile can include information such as, for example, the maximum speed at which the document finishing device can receive sheets of media, the sizes of media sheets that can be received by the document finishing device, and the composition (type) of the media sheets that can be handled. The DFA profile can also include information concerning the output capabilities of the document finishing device. Such output capabilities can include, for example, the maximum number of sheets that can be combined and/or stapled; coating capabilities of the document finishing device; and other capabilities.

Embodiments of the disclosure provide systems and methods for coordinating the capabilities of the document finishing device with the capabilities of the printer.

An embodiment of the disclosure may include a method of operating a document finishing device, the method including installing first data relating to physical capabilities of the document finishing device in a document finishing device; connecting the document finishing device to a printer; copying the first data from the document finishing device to the printer; causing the printer to interpret the first data; and causing the printer to adjust its output capabilities based on the first data.

Another embodiment of the disclosure may include a system for coordinating the operation of a printer and a document finishing device, the system including a printer; a document finishing device connected to the printer; first data relating to physical capabilities of the document finishing device, the first data being located in the document finishing device; and a controller that copies the first data from the document finishing device to the printer. The printer interprets the first data, and the printer adjusts its output capabilities based on the first data.

Another embodiment of the disclosure may include a module for use with a document finishing device, the module including first data relating to physical capabilities of the document finishing device, the first data including input capabilities of the document finishing device; and a controller configured to copy the first data from the document finishing device to a printer connected to the document finishing device. The first data is configured such that it can be interpreted by the printer.

DETAILED DESCRIPTION

Figure 1:
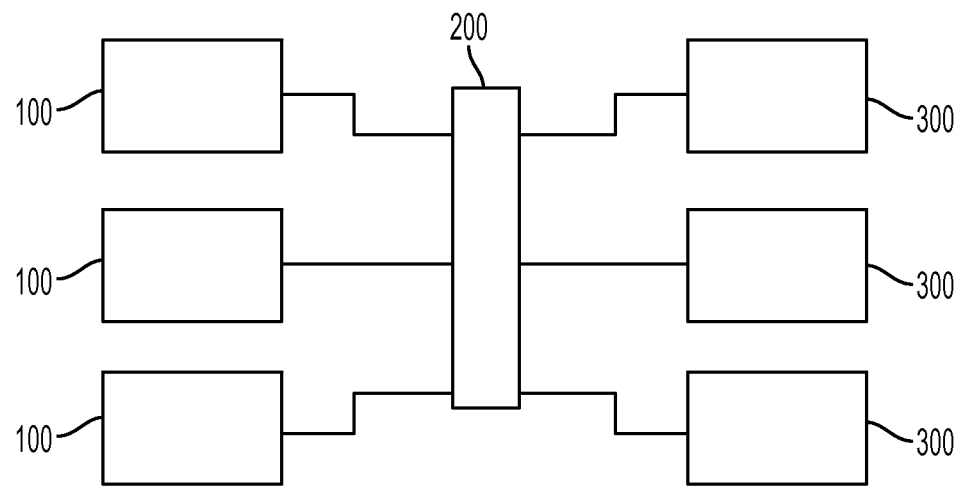
FIG. 1 is a schematic view of a system in accordance with embodiments of the disclosure that has multiple printers and multiple document finishers.

Document finishing devices take the documents outputted by a printer and perform some task such as, for example, combining, stapling, coating, or other operation. A particular document finishing device and the printer it is connected to may be manufactured by different companies. This can cause problems in the communication between the document finishing device and the printer which can, in turn, cause problems such as, for example, jams.

Information concerning the input capabilities of a document finishing device is known as a document finishing architecture (DFA) profile, or data relating to physical capabilities of the document finishing device. The DFA profile can include information such as, for example, the maximum speed at which the document finishing device can receive sheets of media, the sizes of media sheets that can be received by the document finishing device, and the composition (type) of the media sheets that can be handled. The DFA profile can also include information concerning the output capabilities of the document finishing device. Such output capabilities can include, for example, the maximum number of sheets that can be combined and/or stapled; coating capabilities of the document finishing device; and other capabilities.

Embodiments of the disclosure provide systems and methods for coordinating the capabilities of the document finishing device with the capabilities of the printer.

The above-described problems associated with using the document finishing device from one manufacturer and a printer from a different manufacture have, in the past, been caused by the DFA profile of the document finishing device being loaded onto the document finishing device and the printer separately. This can be caused by the devices being installed and set up by different technicians and/or at different times.

Embodiments of the disclosure address this problem by installing the DFA profile in the document finishing device and then having the document finishing device copy the DFA profile onto the printer. In this way, it is assured that both the document finishing device and the printer are using the same DFA profile. The DFA profile can be automatically downloaded, by, for example, a controller, from the document finishing device to the printer during set up of the document finishing device and/or set up of the printer.

The disclosed embodiments may include a method of operating a document finishing device, the method including installing first data relating to physical capabilities of the document finishing device in a document finishing device; connecting the document finishing device to a printer; copying the first data from the document finishing device to the printer; causing the printer to interpret the first data; and causing the printer to adjust its output capabilities based on the first data.

Other disclosed embodiments may include a system for coordinating the operation of a printer and a document finishing device, the system including a printer; a document finishing device connected to the printer; first data relating to physical capabilities of the document finishing device, the first data being located in the document finishing device; and a controller that copies the first data from the document finishing device to the printer. The printer interprets the first data, and the printer adjusts its output capabilities based on the first data.

Other disclosed embodiments may include a module for use with a document finishing device, the module including first data relating to physical capabilities of the document finishing device, the first data including input capabilities of the document finishing device; and a controller configured to copy the first data from the document finishing device to a printer connected to the document finishing device. The first data is configured such that it can be interpreted by the printer.

Embodiments of the disclosure enable one manufacturer's printers to be used with document finishing devices from many other manufactures.

FIG. 1 shows a schematic representation of, in this case, three printers 100 connected to three document finishing devices 300 by way of a printer interface 200. In other examples, one printer can be directly attached to one document finishing device, or any number of printers can be attached to any number of document finishing devices. These connections can be, for example, sheet handling pathways that move documents outputted from a printer to a particular document finishing device.

Each document finishing device 300 contains one or more DFA profiles associated with that particular document finishing device 300. When a printer is attached to document finishing device 300, document finishing device 300 copies to that printer the DFA profile that corresponds to the current capabilities of document finishing device 300.

Figure 2:
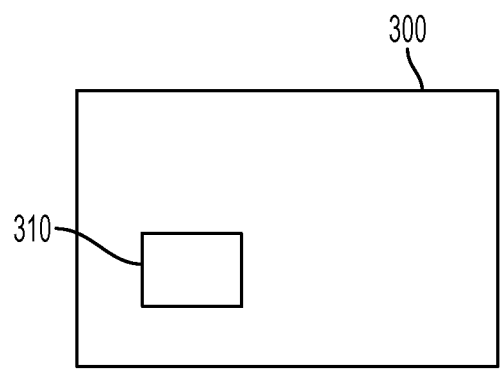
FIG. 2 is a schematic view of a document finisher in accordance with embodiments of the disclosure.

FIG. 2 shows a schematic representation of an example of a document finishing device 300 containing a document finishing architecture profile management module 310. DFA profile management module 310 can be located inside document finishing device 300 or can be attached in some other way to document finishing device 300. DFA profile management module 310 can be a permanent part of document finishing device 300 or can be a removable module. DFA profile management module 310 contains one or more DFA profiles associated with document finishing device 300. Multiple DFA profiles can be useful if additional finishing capabilities are added to document finishing device 300 in the future. For example, if after initial setup a stapling capability is added to document finishing device 300, DFA profile management module 310 can detect the addition of the stapling capability and can automatically send the appropriate DFA profile out to all printers that are attached to document finishing device 300.

Figure 3:
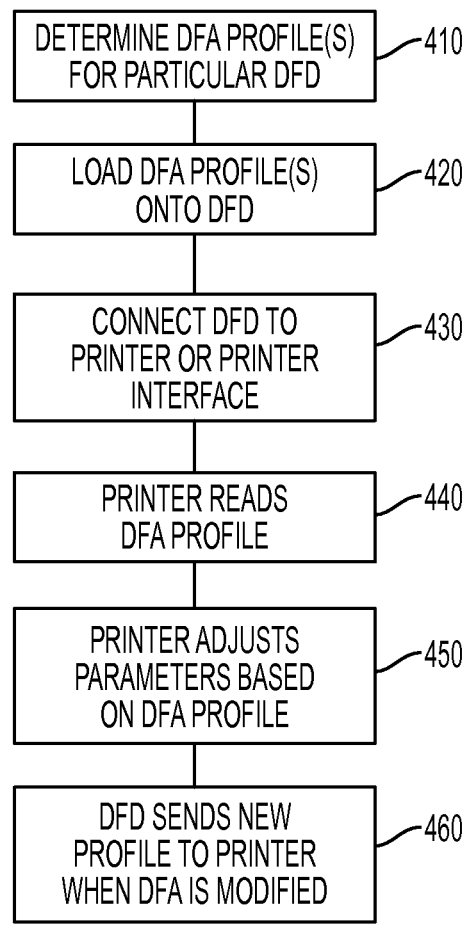
FIG. 3 shows an example of a method in accordance with embodiments of the disclosure.

FIG. 3 shows an exemplary method in accordance with embodiments of the disclosure. In FIG. 3, at 410 an installer or manufacturer determines which DFA profiles should be installed in a particular document finishing device (DFD) and indicates which DFA profile corresponds to the current capabilities of the document finishing device. At 420 these profiles are loaded onto the document finishing device. At 430 the document finishing device is connected to a printer or a printer interface. At 440 each printer attached to the document finishing device reads the DFA profile. At 450 each printer that has received the DFA profile adjusts its output parameters based on the DFA profile. At 460 the document finishing device sends a new DFA profile to each printer when the document finishing architecture is modified.

Figure 4:
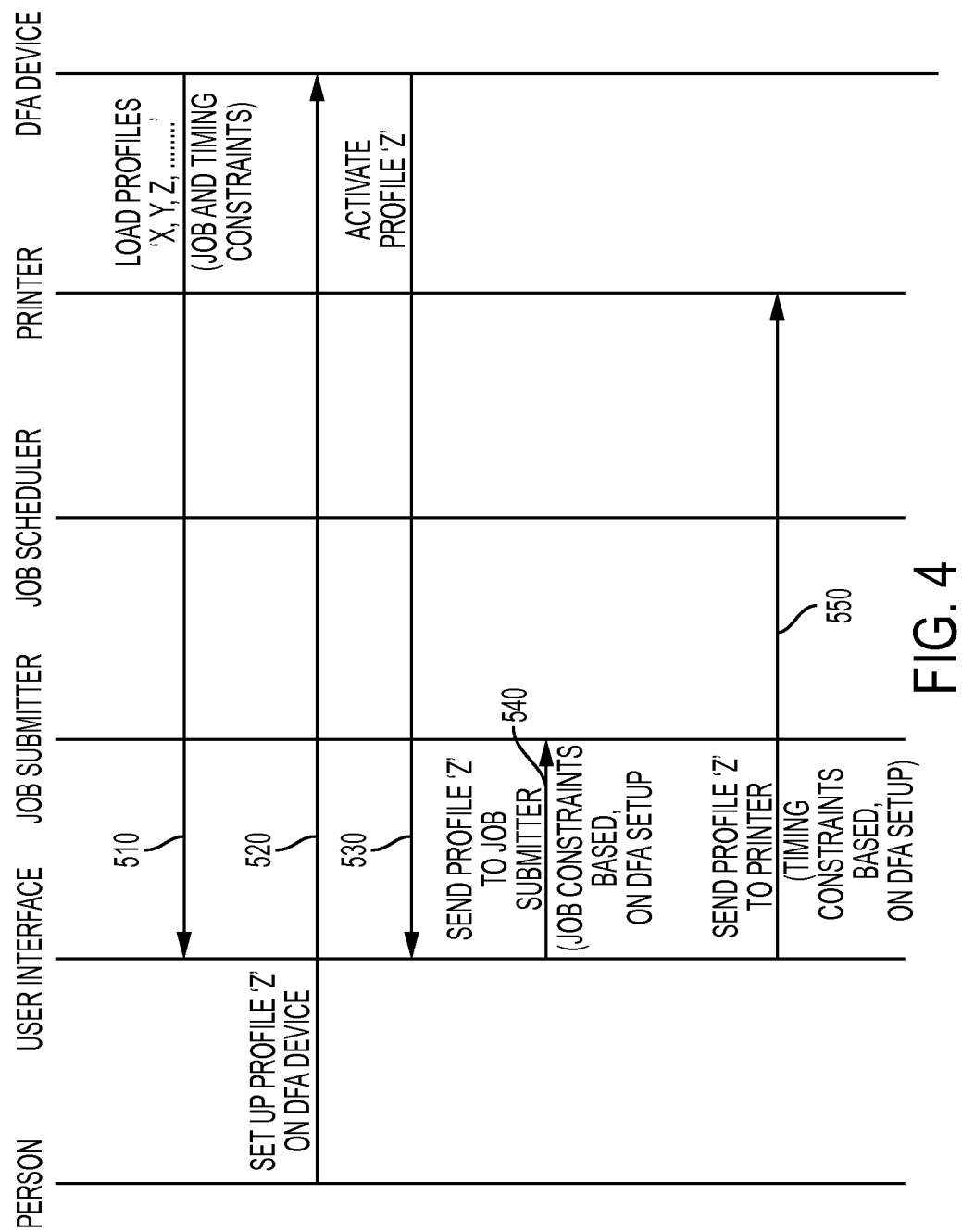
FIG. 4 shows an example of DFA profile data flow in accordance with embodiments of the disclosure.

FIG. 4 shows an example of DFA profile data flow in accordance with embodiments of the disclosure. At 510, DFA profiles are loaded to the user interface. These profiles can include job and timing constraints. At 520, a person can set up a profile (for example, profile Z) on the DFA device. At 530, the DFA device activates the profile set up by the person at 520 (in this example, profile Z) and sends it to the user interface. At 540, the job constraints of profile Z is sent to the job submitter and, at 550, timing constraints of profile Z are sent to the printer.

The exemplary systems and methods in accordance with embodiments of the disclosure ensure that all printers attached to the document finishing device use the correct DFA profile and, as a result, provide documents to the document finishing device in a way that the document finishing device can properly handle them.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of operating a document finishing device (DFD), the method comprising:
    installing first data relating to physical capabilities of the document finishing device at a document finishing architecture (DFA) profile module at the DFD, wherein the first data includes input capabilities of the document finishing device;
    connecting a printer to the document finishing device;
    copying the first data from the DFA profile module to the printer;
    wherein the first data is automatically downloaded from the DFA profile module to the printer during set up of the document finishing device and/or set up of the printer;
    wherein the first data is copied from the DFA profile module to multiple printers when additional output capabilities are added to the DFD;
    causing the printer to interpret the first data;
    causing the printer to adjust its output capabilities based on the first data; and
    in response to the first data being modified by a second data then copying the second data relating to physical capabilities of the document finishing device from the DFA profile module to the multiple printers, the second data containing information that is different from information contained in the first data;
    wherein all printers attached to the DFD use the first data or the second data to produce documents printed that can be received by the DFD.

2. The method of claim 1, wherein the input capabilities of the document finishing device include maximum sheet receiving speed, sheet size, or sheet composition.

3. The method of claim 1, wherein the first data includes output capabilities of the document finishing device.

4. The method of claim 3, wherein the output capabilities of the document finishing device include combining, stapling, or coating.

5. A system for coordinating the operation of a printer and a document finishing device (DFD), the system comprising:
 a printer;
 a document finishing device connected to the printer;
 a document finishing architecture (DFA) profile module at the DFD with first data relating to physical capabilities of the document finishing device, wherein the first data includes at least one of maximum sheet receiving speed, sheet size, and sheet composition of the document finishing device; and
 a controller that copies the first data from the DFA profile module to the printer,
 wherein the first data is automatically downloaded from the DFA profile module to the printer during set up of the document finishing device and/or set up of the printer,
 wherein the controller copies the first data from the DFA profile module to multiple printers when additional output capabilities are added to the DFD,
 wherein the printer interprets the first data,
 the printer adjusts its output capabilities based on the first data; and
 a second data relating to physical capabilities of the document finishing device, the second data being located in the document finishing device,
 wherein the controller is configured in response to the first data being modified by the second data then copying the second data from the DFA profile module to the multiple printers,
 wherein the second data contains information that is different from information contained in the first data;
 wherein all printers attached to the DFD use the first data or the second data to produce documents printed that can be received by the DFD.

6. The system of claim 5, wherein the first data includes input capabilities of the document finishing device.

7. The system of claim 5, wherein the first data includes output capabilities of the document finishing device.

8. The system of claim 7, wherein the output capabilities of the document finishing device include combining, stapling, or coating.

9. A document finishing architecture (DFA) profile module for use with a document finishing device (DFD), the DFA profile module comprising:
 first data relating to physical capabilities of the document finishing device, the first data including input capabilities of the document finishing device; and
 a controller configured to copy the first data from the DFA profile module to a printer connected to the document finishing device,
 wherein the controller copies the first data from the DFA profile module to multiple printers when additional output capabilities are added to the DFD,
 wherein the first data is configured such that it can be interpreted by the printer to adjust its output capabilities;
 wherein the controller is configured in response to the first data being modified by a second data then copying the second data relating to physical capabilities of the document finishing device from the DFA profile module to the printer, and
 the second data contains information that is different from information contained in the first data;
 wherein the controller automatically downloads the second data from the DFA profile module to the printer during set up of the document finishing device and/or set up of the printer;
 wherein all printers attached to the DFD use the first data or the second data to produce documents printed that can be received by the DFD.

10. The module of claim 9, wherein the first data includes output capabilities of the document finishing device.

* * * * *